United States Patent [19]

Uchida et al.

[11] Patent Number: 4,993,930
[45] Date of Patent: Feb. 19, 1991

[54] VACUUM PUMP APPARATUS AND SHAFT SEALING DEVICE THEREFOR

[75] Inventors: Riichi Uchida, Ibaraki; Kotaro Naya, Shimizu, both of Japan

[73] Assignee: Hitachi, Ltd., Tokyo, Japan

[21] Appl. No.: 221,127

[22] Filed: Jul. 19, 1988

[30] Foreign Application Priority Data

Jul. 22, 1987 [JP] Japan ................................ 62-181025

[51] Int. Cl.$^5$ ........................ F04C 18/18; F04C 27/00
[52] U.S. Cl. ................................ 418/104; 418/DIG. 1
[58] Field of Search ...................... 418/201 R, 104, 95, 418/2, DIG. 1; 277/226

[56] References Cited

U.S. PATENT DOCUMENTS

| | | | |
|---|---|---|---|
| 4,465,442 | 8/1984 | Lang et al. | 418/104 |
| 4,770,615 | 9/1988 | Fujiwara et al. | 418/15 |
| 4,781,553 | 11/1988 | Nomura et al. | 418/201 R |
| 4,797,068 | 1/1989 | Hayakawa et al. | 418/201 R |

Primary Examiner—Louis J. Casaregola
Assistant Examiner—Timothy S. Thorpe
Attorney, Agent, or Firm—Antonelli, Terry, Stout & Kraus

[57] ABSTRACT

A vacuum pump apparatus comprises a male and female screw rotors meshing with each other, a casing for accommodating the male and female screw rotors and having a working space, a suction port and a discharge port both communicating with the working space, bearing portions for supporting shafts of the male and female screw rotors on the suction and discharge sides thereof. Shaft seal portions which are respectively disposed between the working space and each of the bearing portions and are adapted to seal the shafts of the male and female screw rotors on the suction and discharge sides thereof. Seal gas introducing device introduces seal gas into the shaft seal portions, and a controller controls the pressure of the seal gas introduced into the shaft seal portions.

9 Claims, 3 Drawing Sheets

VACUUM PUMP APPARATUS AND SHAFT SEALING DEVICE THEREFOR

BACKGROUND OF THE INVENTION

The present invention relates to a vacuum pump apparatus, and, more particularly, to a non-lubricated vacuum pump apparatus which does not employ oil for cooling and lubrication in a working space and which is suitable for handling corrosive gas used in producing semiconductor devices or gas in which a reaction product is produced. The present invention also concerns a shaft sealing device for this pump apparatus.

When gas suctioned and exhausted by a vacuum pump is corrosive gas or noxious gas containing dust, or the like, a means is available for introducing inert gas into an internal housing in order to protect a drive apparatus such as a motor or a wiring therefor from being corroded by the gas, as disclosed in Japanese Patent Unexamined Publication No. 61-43298.

Meanwhile, in a vacuum pump, a working space is separated from a bearing chamber or a gear chamber by providing a non-contact type shaft sealing device, as disclosed in U.S. Pat. No. 4,714,418. Accordingly, measures are taken to reduce a pressure difference across the shaft seal so as to reduce the shaft sealing load.

In non-lubricated screw vacuum pumps, bearings supporting a male rotor and a female rotor are disposed on both sides of the rotors and a timing gear is provided for synchronizing the rotation of both rotors. Hence, it is necessary to prevent the oil which has lubricated these portions from entering the working space. If such a screw vacuum pump is used for an apparatus for producing semiconductors as a pump for handling corrosive gas or gas in which a reaction product is produced, it is necessary to take protective measures against the corrosion and reaction products in the shaft sealing device, the bearing chamber, and the gear chamber. Particularly, since the concentration of the gas is high in the gear chamber on the discharge side, the discharge side of the gear chamber is subjected to severe conditions as compared with the suction side thereof.

SUMMARY OF THE INVENTION

An object of the present invention is to provide a vacuum pump apparatus which is capable of effectively preventing lubricating oil for bearings for rotors from entering into a working space. Another object of the present invention is to provide a vacuum pump apparatus which is capable of preventing troubles caused by corrosion gas and adhesion of products due to reaction products and which is capable of reducing flow rate of seal gas introduced into a shaft sealing device.

In the present invention, a shaft seal portion on the discharge side is provided with a first floating seal member which is floatable with respect to a rotary shaft, a second floating seal member, and a gas introducing chamber formed between the first and second floating seal members. A seal gas supplying source is connected to this gas introducing chamber via a seal gas introduction line. In addition, the pressure of the gas introduced into the gas introducing chamber is controlled in such a manner that a pressure difference between the gas introducing chamber and the gear chamber is always set to a fixed value.

When the vacuum pump is started, the pressure in the suction port declines, and the rate of this decline is affected by the size of a vessel which is connected to the suction port, the rotational speed of rotors, and the like. Meanwhile, the mean pressure within each tooth space at an end surface of the discharge port is dependent on the pressure within the suction port, while a pressure $P_1$ between floating seal members that are adjacent thereto is dependent on the mean pressure within each tooth space at the end surface of the discharge port. Accordingly, to completely seal the shaft on the discharge side, the pressure between the first and second floating seal members, i.e., the pressure $P_1$ within the gas introducing chamber, and the pressure $P_2$ within the gear chamber must satisfy the formula $P_1 > P_2$. A controller for controlling flow rate of seal gas is adapted to supply a signal for controlling opening degree of a control valve provided in, for instance, the gas introduction line and to allow the seal gas to be introduced from a gas introducing opening into the gas introducing chamber, thereby to control so that the pressure difference of $P_1 - P_2$ always becomes a constant positive pressure.

DESCRIPTION OF THE PREFERRED EMBODIMENT

Figure 1:
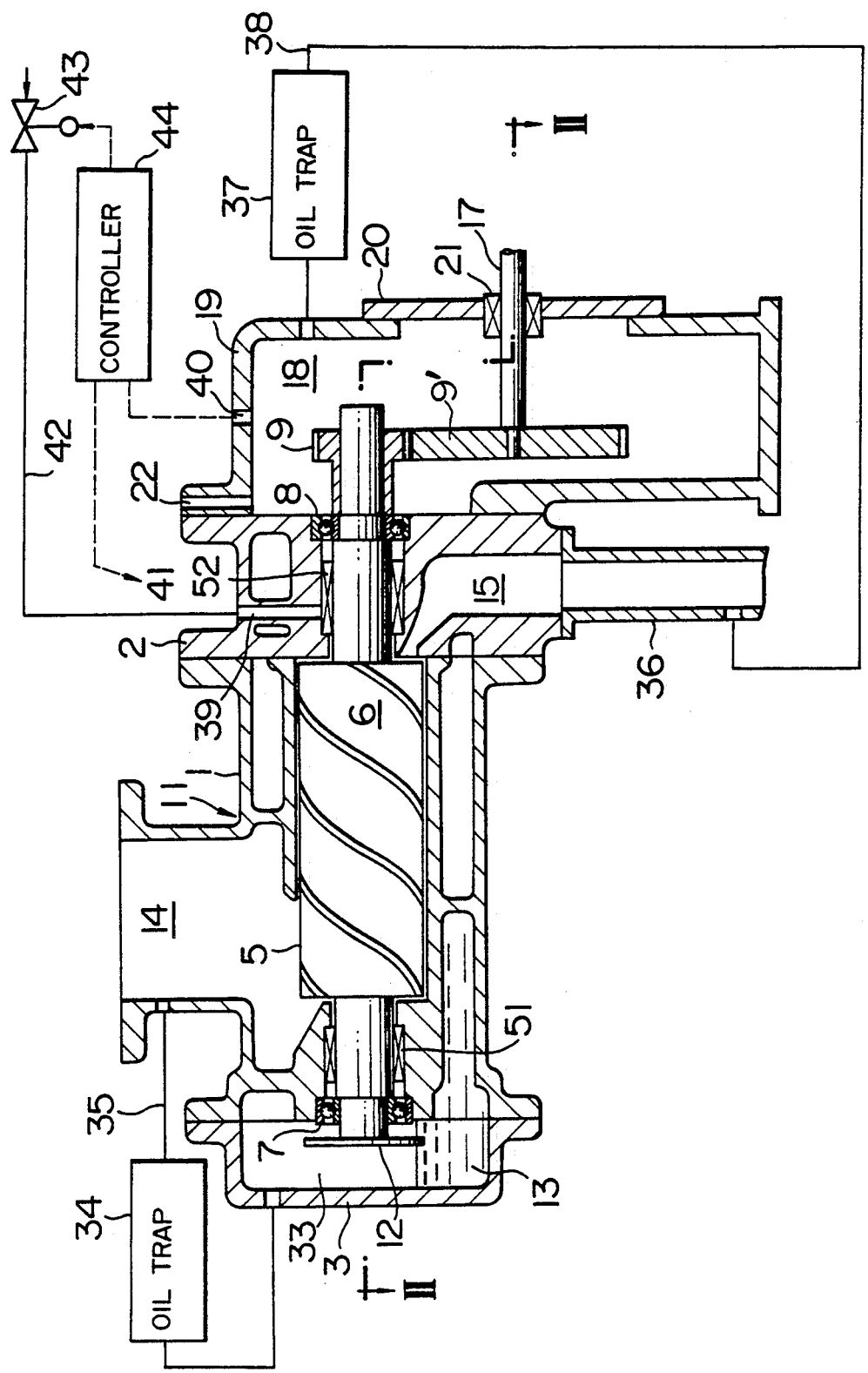
FIG. 1 is a vertical cross-sectional view of a vacuum screw pump apparatus, including a speed increasing gear, in accordance with an embodiment of the present invention.
Figure 2:
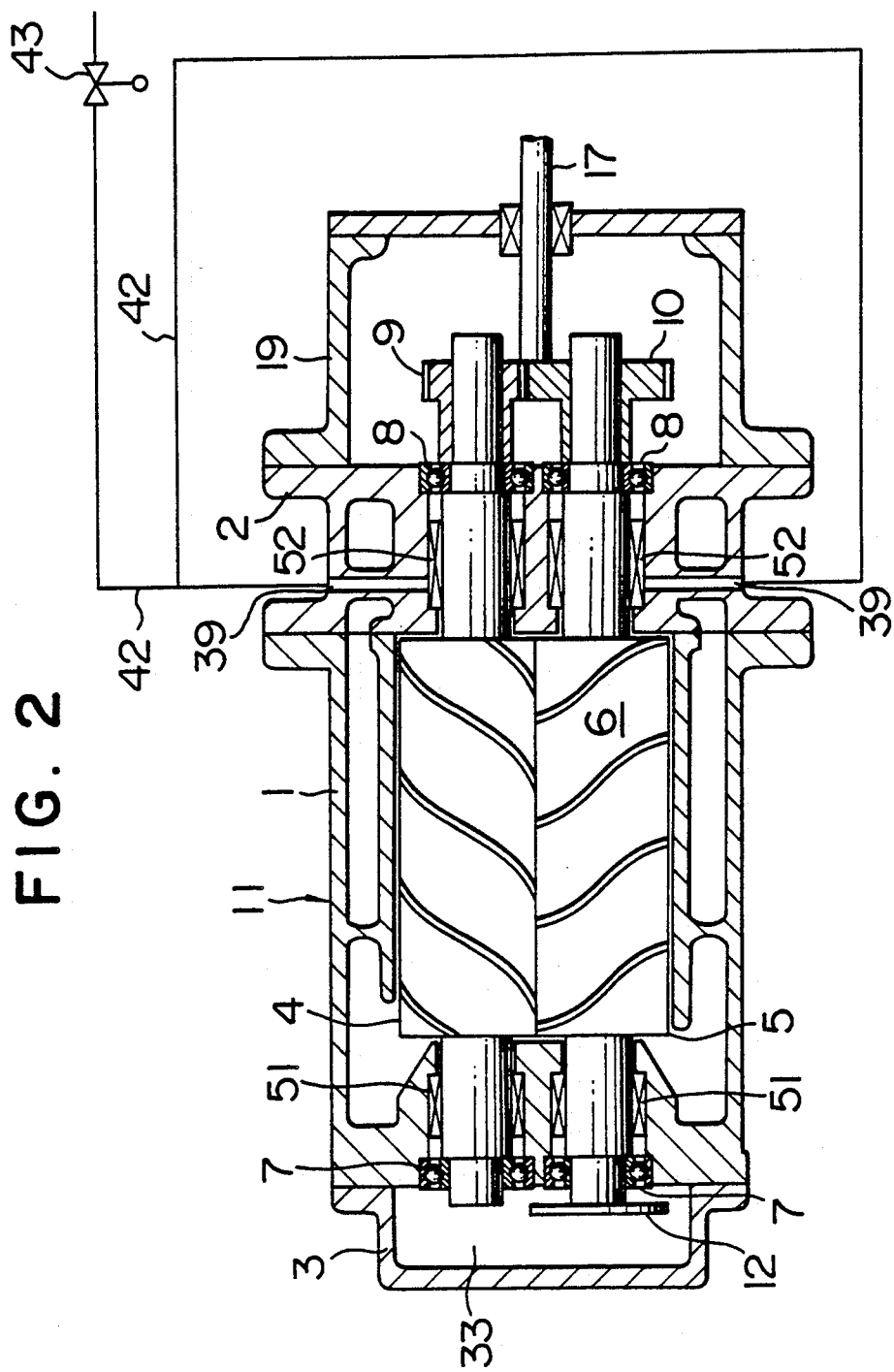
FIG. 2 is a cross-sectional view taken along the line II—II in FIG. 1.

Referring now to the drawings wherein like reference numerals are used throughout the various views to designate like parts and, more particularly, to FIGS. 1 and 2, according to these figures, a vacuum screw pump includes a casing generally designated by the reference numeral 11 comprising a main casing 1, a discharge side casing 2 and an end cover 3, with a male rotor 4 and a female rotor 5 engageable with each other, being accommodated in the casing 11. The main and discharge-side casings 1, 2 define a working space 6 and the main casing 1 and the pair of rotors 4, 5 define a plurality of working chambers.

As shown in FIG. 1, a suction port 14, communicating with the working space 6, is formed in the main casing 1, while a discharge port 15 communicating with the working space 6 is formed in the discharge-side casing 2.

The male and female rotors 4, 5 are supported by roller bearings 7, 8 at their suction and discharge side rotor shafts and a male timing gear 9 and a female timing gear 10 are respectively fixed to the discharge side rotor shafts. The male and female rotors 4, 5 are meshed with each other with a small gap being maintained to be rotated.

In addition, shaft seal portions 51, 52 are respectively provided on both suction and discharge sides of the male rotor 4 and the female rotor 5. These shaft seal portions 51, 52 are adapted to effect sealing so that the lubricating oil used for the roller bearings 7, 8, the timing gears 9, 10 and the like will not leak into the working space 6.

An oil scraping slinger 12 is installed at a tip of the rotor shaft (in this example, on the rotor shaft of the female rotor 5). This slinger 12 is used to supply the lubricating oil to the roller bearings 7 by splashing the lubricating oil in an oil reservoir 13 of a bearing chamber 33 formed by a part of the main casing 1 and the end cover 3. The male timing gear 9 is engaged with a bull gear 9', as shown in FIG. 1, and the bull gear 9' is coupled with an electric motor (not shown) via a drive shaft 17.

A gear chamber 18 is adapted to accommodate a gear system for driving the rotors 4,5, and is hermetically sealed by a gear casing 19, a side plate 20 and a shaft seal member 21. The discharge side casing 2 includes a bearing chamber for the roller bearings 8.

An oiling port 22 is formed in the gear chamber casing 19 and is adapted to supply the lubricating oil to the roller bearings 8, the male timing gear 9, the female timing gear 10, and the bull gear 9' by means of an oiling pump (not shown) provided separately.

Figure 3:
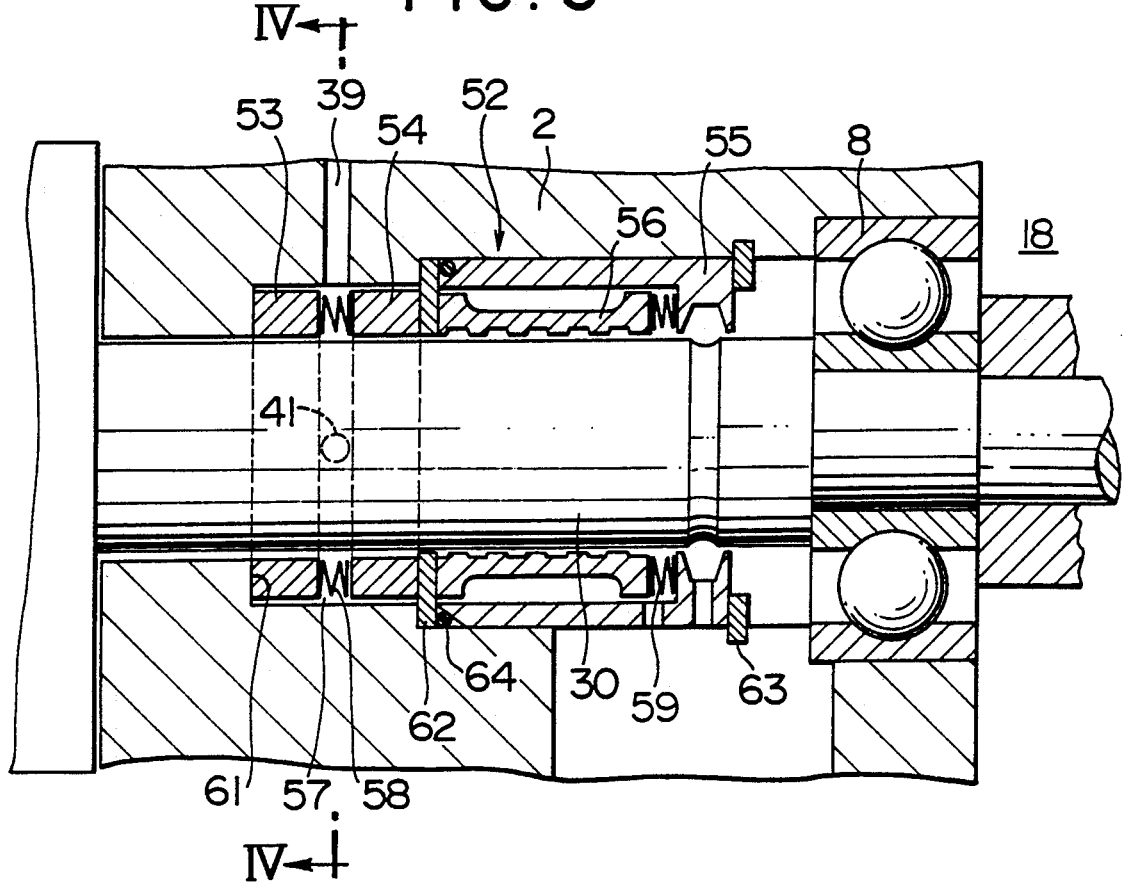
FIG. 3 is an enlarged cross-sectional view of a discharge-side shaft seal portion.
Figure 4:
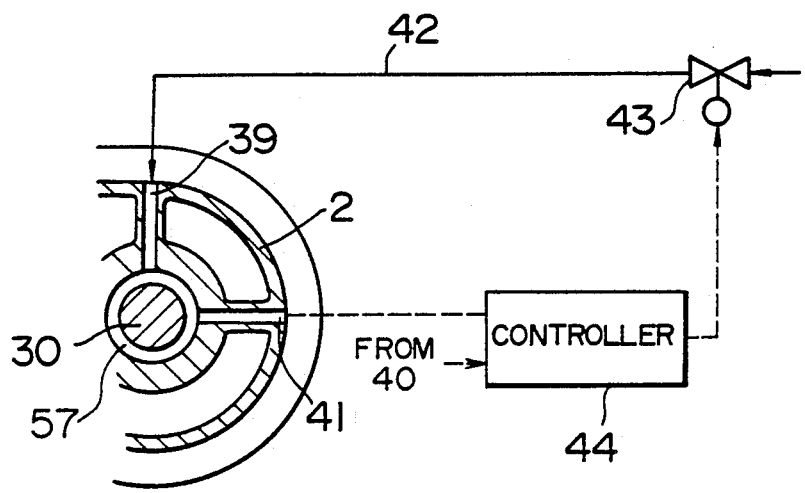
FIG. 4 is a cross-sectional view taken along the line IV—IV in FIG. 3 in which a first floating seal member and a spring are omitted.

As shown most clearly in FIGS. 3 and 4, the first and second floating seal members 53, 54 are provided in a position of the shaft seal portion 52 which is nearer to the rotors, that is, to the working space 6 and disposed between a step portion 61 formed on the discharge-side casing 2 and a spacer 62 provided in the shaft seal portion 52. A labyrinth seal member 55 is provided in a position of the shaft seal portion 52 which is nearer to the roller bearing 8 and disposed between the spacer 62 and a retaining ring 63 for determining the axial position of the labyrinth seal member 55. A threaded seal member 56 is disposed between the first and second floating members 53, 54 and the labyrinth seal member 55 and is adapted to produce a pressure acting from the working space 6 toward the gear chamber 18.

A gas introducing chamber 57 is formed between the first floating seal member 53 and the second floating seal member 54. A spring 58 is provided in this gas introducing chamber 57 and between the first floating seal member 53 and the second floating seal member 54. In addition, a spring 59 is interposed between an end surface portion of the threaded seal member 56 and an end surface portion of the labyrinth seal member 55.

An O-ring 64, interposed between the labyrinth seal member 55 and the spacer 62, is adapted to prevent the leakage of oil from a gap between the labyrinth seal member 55 and the discharge-side casing 2.

A gas introduction hole 39, provided in the discharge-side casing 2, and a pressure detecting hole 41 for detection of the pressure are communicated with the gas introducing chamber 57. A seal gas supplying source (not shown) is communicated with this gas introduction hole 39 via an introduction line 42. Flow rate of the seal gas introduced into the gas introducing chamber 57 is controlled by a control valve 43 provided in the introduction line 42.

A controller 44 is adapted to control opening degree of the control valve 43. This controller 44 compares the pressure $P_2$ of the gear chamber 18 supplied from a pressure fetching hole 40 for detecting the pressure in the gear chamber 18, which is provided in the gear casing 19, with pressure $P_1$ of the gas introducing chamber 57 supplied from the aforementioned pressure detecting hole 41, and outputs a control signal in such a manner that pressure difference of $P_1 - P_2$ always becomes a fixed positive value. A blow pipe 38 for preventing a pressure rising inside the gear chamber 18 during an operation is provided between the gear casing 19 and a discharge pipe 36. An oil trap 37 for separating and recovering the oil in the gas is provided in this blow pipe 38.

The shaft sealing means of the suction-side shaft seal portion 51 is arranged in the same way as the discharge-side shaft seal portion 52 shown in FIG. 3, except for the gas introduction hole 39 and pressure detecting hole 41, but is provided with a pipe for eliminating a pressure difference across the shaft seal portion 51. Namely, in FIG. 1, a uniform pressure pipe 35 communicates between the suction port 14 and the bearing chamber 33, and is provided with an oil trap 34 for separating the oil contained in the gas.

In a stopped condition, the suction port 14, working space 6, discharge port 15, bearing chamber 33, and gear chamber 18 are all under atmospheric pressure. In this state, when the vacuum pump is started, as the one of working chambers moves from the side of the suction port 14 toward the side of the discharge port 15, the pressure on the side of the suction port 14 falls gradually, and the distribution of the pressure inside the working space 6 becomes such that the pressure becomes lower from the suction ends toward the discharge ends of the rotors. Since the bearing chamber 33 is communicated with the suction port 14 by means of the uniform pressure pipe 35, the pressure difference across the suction-side shaft seal portion 51 becomes virtually negligible. In addition, by virtue of the action of the labyrinth seal member 55 and the threaded seal member 56, the oil which has lubricated the roller bearings 7 is prevented from leaking into the working space 6.

Meanwhile, with respect to the discharge-side shaft seal portion 52, since the mean pressure in each tooth space at the end surfaces of the rotors declines in accordance with the decline in the pressure inside the suction port 14, the pressure between the first floating seal member 53 and the second floating seal member 54 that are disposed adjacent to the end surfaces of the rotors also falls. Subsequently, the pressure $P_1$ between the first floating seal member 53 and the second floating seal member 54, that is, in the gas introducing chamber 57 becomes imbalanced with the pressure $P_2$ inside the gear chamber 18, and a signal for adjusting the opening degree of the valve 43 is issued from the controller 44 to the control valve 43. As a result, the seal gas is introduced between the first floating seal member 53 and the second floating seal member 54, that is, in the gas introducing chamber 57, thereby making it possible to maintain the state of $P_1 > P_2$. Therefore, lubricating oil is prevented from entering the working space 6. Further, as the pressure $P_1$ in the gas introducing chamber 57 becomes higher than the working space 6, a part of the seal gas can flow into the working space 6, so that gas suctioned by the vacuum pump is prevented from entering the working space 6.

According to the present invention, a vacuum pump apparatus is provided which is capable of effectively preventing the lubricating oil for bearings from entering the working space and which is capable of preventing troubles caused by the corrosion gas and adhesion of the reaction products.

In the foregoing embodiment, although a description has been given of a non-lubricated vacuum screw pump, a similar effect can be obtained even in the case of other types of vacuum pump apparatus in which oil is not present in the working space, but lubricating oil for the bearing portion is used, and which is operated when the pressure within the working space is lower than that within the bearing portion. Such alternative vacuum pump apparatus include, for example, a movable wing- or Root-type vacuum pump apparatus and an axial flow-type or centrifugal-type vacuum pump apparatus.

What is claimed is:

1. A vacuum pump apparatus comprising:
   a pair of male and female screw rotors meshing with each other;
   a casing for accommodating said male and female screw rotors and including a working space, a suction port and a discharge port both communicating with said working space;
   bearing portions for supporting shafts of said male and female screw rotors on suction and discharge sides thereof;
   shaft seal portions respectively disposed between said working space and each of said bearing portions and adapted to seal said shafts of said male and female screw rotors on the suction and discharge sides thereof;
   seal gas introducing means for introducing seal gas into said shaft seal portions; and
   a controller for controlling a pressure of said seal gas introduced into said shaft seal portions in dependence upon a pressure of the seal gas introduced by said seal gas introducing means such that the pressure of the seal gas on a side of the shaft seal portion facing the working space on the discharge side is greater than a pressure on an opposite side of said shaft portion so as to provide a positive differential pressure across said shaft seal portion at said discharge side.

2. A vacuum pump apparatus comprising:
   a pair of male and female screw rotors meshing with each other;
   a casing for accommodating said male and female screw rotors and including a working space, a suction port and a discharge port both communicating with said working space;
   bearing portions for supporting shafts of said male and female screw rotors on suction and discharge sides thereof;
   shaft seal portions respectively disposed between said working space and each of said bearing portions and adapted to seal said shafts of said male and female screw rotors on the suction and discharge sides thereof;
   seal gas introducing means for introducing seal gas into said shaft seal portions;
   a controller for controlling a pressure of said seal gas introduced into said shaft seal portions, and
   wherein said shaft seal portion on the discharge side comprises a first floating seal member, a second floating seal member, a gas introducing chamber formed between said first and second floating seal members and communicating with said seal gas introducing means, a threaded seal member for producing a pressure acting from the side of said working space toward the side of said bearing portion, and a labyrinth seal member disposed on the side of said bearing portion.

3. A vacuum pump apparatus comprising:
   a pair of male and female screw rotors meshing with each other;
   a casing for accommodating said male and female screw rotors and including a working space, a suction port and a discharge port both communicating with said working space;
   bearing portions and shaft seal portions disposed on a suction side and a discharge side of rotor shafts of said male and female screw rotors;
   accommodating means for accommodating the respective bearing portions on the suction and discharge sides of said male and female screw rotors;
   seal gas introducing means for introducing seal gas into gas introducing chambers of said shaft seal portions; and
   a controller for controlling the pressure of said seal gas introduced into said gas introducing chambers of said shaft seal portions on the basis of the pressure of the seal gas in said gas introducing chambers and the pressure inside said means for accommodating the respective bearings portions.

4. A vacuum pump apparatus comprising:
   a rotary body;
   a casing for accommodating said rotary body and having a working space formed by said rotary body, a suction port and a discharge port both communicating with said working space;
   bearing portions for supporting suction and discharge sides of said rotary body on said casing;
   shaft seal portions for sealing the suction and discharge sides of said rotary body against said casing;
   seal gas introducing means for introducing seal gas into said shaft seal portions; and
   a controller for controlling pressure of said seal gas introduced into said shaft seal portions in dependence upon a pressure of the seal gas introduced by said gas introducing means such that the pressure of the seal gas on a side of the shaft seal portion facing the working space on the discharge side is greater than a pressure on an opposite side of said shaft seal portion so as to provide a positive differential pressure across said shaft seal portion at said discharge side.

5. A vacuum pump apparatus comprising:
   a rotary body;
   a casing for accommodating said rotary body and having a working space formed by said rotary body, a suction port and a discharge port both communicating with said working space;
   bearing portions for supporting the suction and discharge sides of said rotary body on said casing;
   shaft seal portions for sealing the suction and discharge sides of said rotary body against said casing;
   seal gas introducing means for introducing seal gas into said shaft seal portions; and
   a controller for controlling pressure of said seal gas introduced into said shaft seal portions, and
   wherein said shaft seal portion on the discharge side comprises a first floating seal member, a second floating seal member, a gas introducing chamber formed between said first and second floating seal members and communicating with said seal gas introducing means, a threaded seal member for producing pressure from a side of said working space toward the side of said bearing portion, and a labyrinth seal member disposed on the side of said bearing portion.

6. A vacuum pump apparatus comprising:
   a rotary body;
   a casing for accommodating said rotary body and having a working space formed by said rotary body, a suction port and a discharge port both communicating with said working space;

bearing portions and shaft seal portions respectively disposed on suction and discharge sides of said rotary body;

means for accommodating said bearing portions on the suction and discharge sides of said rotary body;

seal gas introducing means for introducing seal gas into said shaft seal portion; and a controller for controlling pressure of said seal gas introduced into said shaft seal portions in dependence upon a pressure of the seal gas introduced by said gas introducing means such that the pressure of the seal gas on a side of the shaft seal portion facing the working space on the discharge side is greater than a pressure on an opposite side of said shaft seal portion so as to provide a positive differential pressure across said shaft seal portion at said discharge side.

7. A shaft sealing device for a vacuum pump apparatus having a rotary body accommodated in a casing, a working spaced formed by said rotary body and shaft seal portions around shafts of said rotary body, said shaft sealing device comprising:

a first floating seal member;
a second floating seal member;
a gas introducing chamber formed between said first and second floating seal member;
gas introducing means for introducing seal gas into said gas introducing chamber;
pressure detecting means for detecting gas pressure within said gas introducing chamber and providing an output signal of the detected gas pressure; and
control means responsive to the output signal for controlling a pressure of seal gas introduced into said gas introducing chamber by said gas introducing means such that the pressure of the seal gas in the gas introducing chamber is greater than the a pressure on a side of the shaft seal portion facing away from the working space so as to provide a positive differential pressure across said shaft seal portion.

8. A seal gas pressure controlling apparatus for a vacuum pump comprising a rotary body, a casing for accommodating said rotary body and having a working space, a suction portion and a discharge port both communicating with said working space, bearing portions and shaft seal portions respectively disposed on a suction and discharge side of said rotary body means for accommodating said bearing portions on said suction and discharge side of said rotary body, seal gas introducing means for introducing seal gas into gas introducing chambers formed in said seal portions, wherein said seal gas pressure controlling apparatus comprises:

means for detecting first gas pressure in said gas introducing chambers and second gas pressure in said means for accommodating said bearing portions on the discharge side; and controlling means for comparing said first and second gas pressure detected by said detecting means to control the first gas pressure so that the first gas pressure becomes higher than the second gas pressure at a constant positive value.

9. A seal gas pressure controlling apparatus according to claim 8, wherein said controlling means comprises:

pressure control valve disposed in gas introducing lines communicated with said gas introducing chambers; and a controller for controlling said pressure control valve in accordance with said detected first and second gas pressure.

* * * * *